(12) United States Patent
Bouchetou et al.

(10) Patent No.: US 11,208,354 B2
(45) Date of Patent: Dec. 28, 2021

(54) SINTERED ZIRCONIA MULLITE REFRACTORY COMPOSITE, METHODS FOR ITS PRODUCTION AND USE THEREOF

(71) Applicant: ImerTech SAS, Paris (FR)

(72) Inventors: Marie-Laure Bouchetou, Orleans (FR); Olivier Joubert, Izon (FR); Jacques Poirier, St Pryvé-St Mesmin (FR); Michael Weissenbacher, Innsbruck (AT)

(73) Assignee: ImerTech SAS, Paris (FR)

( * ) Notice: Subject to any disclaimer, the term of this patent is extended or adjusted under 35 U.S.C. 154(b) by 0 days.

(21) Appl. No.: 15/773,580

(22) PCT Filed: Nov. 3, 2016

(86) PCT No.: PCT/EP2016/076495
§ 371 (c)(1),
(2) Date: May 4, 2018

(87) PCT Pub. No.: WO2017/076941
PCT Pub. Date: May 11, 2017

(65) Prior Publication Data
US 2018/0327314 A1    Nov. 15, 2018

(30) Foreign Application Priority Data
Nov. 5, 2015    (DE) .................. 10 2015 119 053.2

(51) Int. Cl.
| | | |
|---|---|---|
| *C04B 35/106* | (2006.01) | |
| *C04B 35/185* | (2006.01) | |
| *C04B 35/119* | (2006.01) | |
| *C04B 35/626* | (2006.01) | |

(52) U.S. Cl.
CPC .......... *C04B 35/106* (2013.01); *C04B 35/119* (2013.01); *C04B 35/62625* (2013.01); *C04B 2235/327* (2013.01); *C04B 2235/3463* (2013.01); *C04B 2235/602* (2013.01); *C04B 2235/606* (2013.01); *C04B 2235/6562* (2013.01); *C04B 2235/6565* (2013.01); *C04B 2235/6567* (2013.01); *C04B 2235/661* (2013.01); *C04B 2235/77* (2013.01); *C04B 2235/80* (2013.01); *C04B 2235/96* (2013.01); *C04B 2235/9607* (2013.01); *C04B 2235/9669* (2013.01)

(58) Field of Classification Search
CPC ........................... C04B 35/106; C04B 35/185
See application file for complete search history.

(56) References Cited

U.S. PATENT DOCUMENTS

| | | | | |
|---|---|---|---|---|
| 4,326,040 A | * | 4/1982 | Kaji ................... | B22D 41/54 501/100 |
| 7,943,541 B2 | * | 5/2011 | Avedikian ............ | C04B 35/105 501/105 |
| 8,138,109 B2 | * | 3/2012 | Takenami ............. | B22D 41/30 501/105 |
| 2010/0298109 A1 | * | 11/2010 | Takenami ............. | B22D 41/30 501/4 |

FOREIGN PATENT DOCUMENTS

| | | |
|---|---|---|
| DE | 2 131 442 | 1/1973 |
| DE | 21 31 442 A1 | 1/1973 |
| EP | 0 325 345 A1 | 7/1989 |
| JP | 2-6370 | 1/1990 |
| JP | 4-46058 | 2/1992 |
| JP | 5-146848 | 6/1993 |

OTHER PUBLICATIONS

International Search Report and Written Opinion dated Feb. 7, 2017, in International Application No. PCT/EP2016/076495 (24 pgs.).
Rendtorff et al., "A short and long range study of mullite-zirconia-zircon composites", Hyperfine Interactions, Kluwer Academic Publishers, DO, vol. 198, No. 1-3, Jul. 21, 2010, pp. 219-228.
Carbajal et al., "Microstructure and mechanical behavior of aluminazirconiamullite refractory materials", Ceramics International, Elsevier, Amsterdam, NL, vol. 38, No. 2, Sep. 27, 2011, pp. 1617-1625.
Rendtorff et al., "Thermal shock resistance and fatigue of ZirconMullite composite materials", Ceramics International, Elsevier, Amsterdam, NL, vol. 37, No. 4, Jan. 25, 2011, pp. 1427-1434.
Zanelli et al., "Phase composition of alumina-mullite-zirconia refractory materials", Journal of the European Ceramic Society, Elsevier Science Publishers, Barking Essix, GB, vol. 30, No. 1, Jan. 1, 2010, pp. 29-35.
Rendtorff et al., "Mechanical and fracture properties of zircon-mullite composites obtained by direct sintering", Ceramics International, Elsevier, Amsterdam, NL, vol. 35, No. 7, Sep. 1, 2009, pp. 2907-2913.
Rendtorff et al., "Mullite-zirconia-zircon composites: Properties and thermal shock resistance", Ceramics International, Elsevier, Amsterdam, NL, vol, 35, No. 2, Mar. 1, 2009, pp. 779-786.
Aksel, C., "The microstructural features of an alumina-mullite-zircon refractory material corroded by molten glass", Ceramics International, Elsevier, Amsterdam, NL, vol. 29, No. 3, Jan. 1, 2003, pp. 305-309.
Aksel, C., "The influence of zircon on the mechanical properties and thermal shock behavior of slip-cast alumina-mullite refractories", Materials Letters, North Holland Publishing Company, Amsterdam, NL, vol. 57, No. 4, Dec. 1, 2002, pp. 992-997.

(Continued)

*Primary Examiner* — Karl E Group
(74) *Attorney, Agent, or Firm* — Finnegan, Henderson, Farabow, Garrett & Dunner LLP

(57) ABSTRACT

The present invention relates to a zirconia mullite refractory composite comprising 55 wt.-% to 65 wt.-% $Al_2O_3$, 15 wt.-% to 25 wt.-% $SiO_2$, 15 wt.-% to 25 wt.-% $ZrO_2$ and less than 3 wt.-% raw material based impurities, whereby the mineralogical composition of the composite comprises 65 wt.-% to 85 wt.-% mullite and 15 wt.-% to 35 wt.-% zirconia.

13 Claims, 2 Drawing Sheets

(56) References Cited

OTHER PUBLICATIONS

Figure 1:
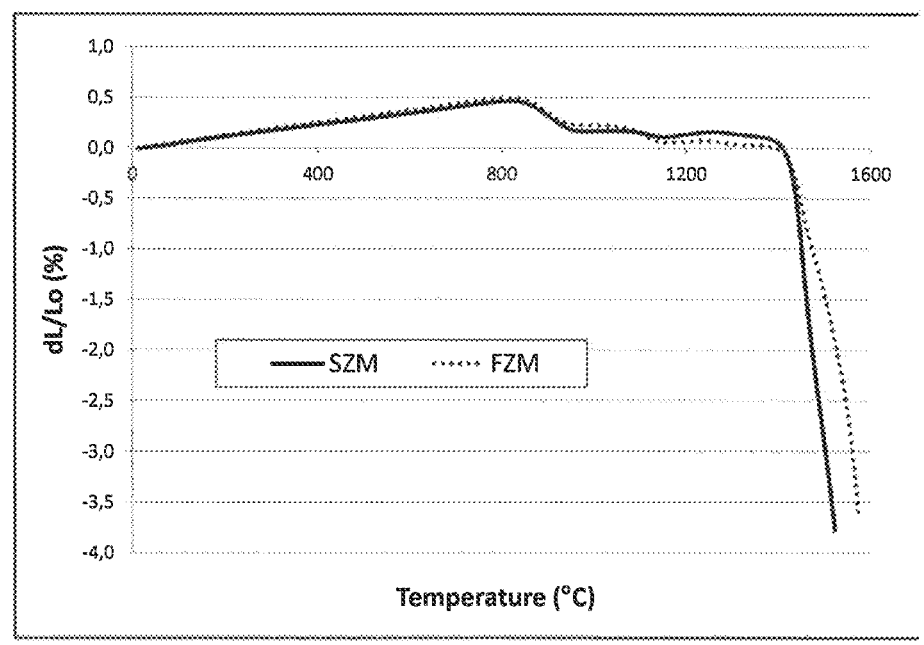

Aksel et al., "The Corrosion Resistance of Alumina-Mullite-Zircon Refractories in Molten Glass", Key Engineering Materials, vol. 264-268, Jan. 1, 2004, pp. 1803-1806.

Aksel, C., "Thermal Shock Behaviour of Alumina-Mullite-Zircon Refractories", Key Engineering Materials, vol. 264-268, Jan. 1, 2004, pp. 1747-1750.

Moya et al., "Effect of Zr02 (ss) in mullite on the sintering and mechanical properties of mullite / Zr02 composites", Journal of Materials Science Letters, Jan. 1, 1983, pp. 599-602.

* cited by examiner

SINTERED ZIRCONIA MULLITE REFRACTORY COMPOSITE, METHODS FOR ITS PRODUCTION AND USE THEREOF

CLAIM FOR PRIORITY

This application is a U.S. national phase entry under 35 U.S.C. § 371 from PCT International Application No. PCT/EP2016/076495, filed Nov. 3, 2016, which claims the benefit of priority of DE Application No. 10 2015 119 053.2, filed Nov. 5, 2015, both of which this application claims priority and both of which are incorporated herein by reference.

FIELD OF THE INVENTION

The present invention relates to sintered zirconia mullite refractory composite based on aluminosilicate, alumina and zircon sand. The invention further relates to a method for producing sintered zirconia mullite refractory composites and sintered zirconia mullite fine ceramics as well as corresponding cast or compacted refractory products obtained from said composites.

TECHNICAL BACKGROUND

Refractory products are widely used in the field of the production of iron, steel, nonferrous metal, cement and glass, as well as for Incinerators, ash melting furnaces, and similar equipment. Zirconia mullite composites are commonly used as raw materials for refractory products due to their excellent properties such as high melting point, high strength, and fracture toughness as well as good wear, thermal shock and corrosion resistance. Generally, zirconia mullite refractory raw material is industrially produced through a fusion process by melting a mixture of zircon sand and alumina in an electric arc furnace. Fused zirconia mullite is used for special products where high corrosion resistance and low thermal expansion are required. The applications comprise ceramic casting tubes and shaped refractory bodies requiring high resistance against molten slags and molten glass.

The zirconia mullite refractory raw material comprises a mineral phase mainly consisting of crystalline zirconia and mullite, wherein zirconia crystal grains are dispersed in a mullite matrix. Typically, the crystal grains of crystalline zirconia in fused zirconia mullite composites have a grain size up to 100 µm. A glassy phase is additionally present in zirconia mullite raw materials.

A fused zirconia mullite refractory composite with improved microstructure is described in U.S. Patent Application No. 2010-0298109 A1. The zirconia mullite refractory raw material comprises crystalline zirconia and mullite as primary components, with the remainder being corundum and/or a glass matrix, wherein the crystalline zirconia includes eutectic zirconia crystals having a grain size of 1 µm or less and wherein the crystalline zirconia has a maximum grain size of 30 µm or less.

The preparation and sintering properties of further zirconia mullite corundum composites are described in Trans. Nonferrous Met. Soc. China 20 (010) 2331-2335. The composites are prepared from fly ash, zircon sand and alumina powder by reaction sintering processes. Materials are provided wherein zirconia particles having a particle size around 5 µm are homogeneously distributed in a mullite matrix.

U.S. Pat. No. 6,054,402 describes a thermally insulating component formed from a composition consisting of a mixture of zirconium oxide in a range from about 5% to about 25% by volume and mullite in a range from about 75% to about 95% by volume, said mixture being a homogeneous dispersion of zirconium oxide in mullite being obtained by chemically mixing mullite and Zirconium oxide by a sol-gel process.

However, in many cases, the desired operating life is not achieved by using the established zirconia mullite composites or the products obtained therefrom, due to lacking thermal shock resistance and lacking corrosion resistance. Particularly, the performances of conventional zirconia mullite refractories are not sufficient in terms of their lifetime requirements with regard to a replacement of the alumina chromium oxide refractories which generate big environmental problems. Furthermore, there is always a great demand in the refractory industry for improved and more favorable composites for refractory products.

Thus, it is an aim of the present invention to provide an improved corrosion resistant and thermal shock resistant composite for the production of refractories. It is another object of the present invention to provide effective refractories for replacing alumina chromium oxide refractories.

SHORT DESCRIPTION OF THE INVENTION

The problem is solved by a sintered zirconia mullite refractory composite based on aluminosilicate, alumina and zircon sand, having the chemical composition comprising in weight-percent, 55% to 65% $Al_2O_3$, 15% to 25% $SiO_2$, 15% to 25% $ZrO_2$, and less than 3% raw material-based impurities. The zirconia mullite refractory composite has a mineralogical composition comprising 65 wt.-% to 85 wt.-%, preferably 65 wt.-% to 74 wt.-%, mullite and 15 wt.-% to 35 wt.-% zirconia. Preferably, andalusite, sillimanite or kyanite are used as the aluminosilicate.

The present invention is based on the idea to produce a zirconia mullite composite for the production of refractories consisting essentially of mullite and zirconia, starting from andalusite or other aluminosilicates in combination with alumina and zircon sand.

In a preferred embodiment, the raw material basis of the composite comprises 25 wt.-% to 35 wt.-% andalusite, 35 wt.-% to 45 wt.-% alumina, and 25 wt.-% to 35 wt.-% zircon sand. Sillimanite, kyanite or other aluminosilicates can be used instead of andalusite. It is also possible to directly use alumina and silica in amounts corresponding to the andalusite.

The sintered composite has a microstructure comprising essentially homogeneously distributed zirconia particles in a mullite matrix wherein the average particle diameter of the zirconia particles is preferably less than 5 µm, more preferably, less than 2 µm.

Due to its high thermal shock and corrosion resistance against molten glass or molten slags, the composite according to the present invention is well suitable as a castable for the production of refractory bricks and cast pieces, wherein the castable, after sintering at a temperature range between 1000° C. and 1700° C., preferably has a Cold Module of Rupture (CMOR), measured according to EN 1402-5, of more than 80 MPa and a Cold Crushing Strength (CCS), measured according to EN 1402-6, of more than 500 MPa.

The refractory castables produced from the composites according to the present invention are preferably low cement castables (LCC) having a cement content of about 5 percent by weight, more preferably ultra-low cement castables (ULCC) having a cement content of less than 2 percent by weight.

The production of the zirconia mullite composite can be carried out according to different methods distinguished from each other only by small sub-steps.

The general method for the production of the sintered zirconia mullite refractory composite according to the present invention comprises the steps of homogeneously mixing finely grounded raw materials, forming a shaped body from the homogeneous mixture of the raw materials, sintering the shaped body at a temperature range between 1400° C. and 1700° C., and crushing the sintered product to obtain the desired grain size distribution.

According to a preferred production method for the present sintered zirconia mullite refractory composite, firstly, the raw materials are homogenized by intensive mixing. For this step, it is important to use fine grained raw materials. If necessary, the raw materials have to be milled to a desired grade of fineness before their use. According to the wet process, from 15 wt.-% to 45 wt.-% water and from 0.1 wt.-% to 1.0 wt.-% of a dispersant, each based on the total weight of the raw material mixture, are added to the raw material mixture so obtained. The mixture is homogenized to obtain a homogeneous dispersion which is cast into a mold. The molded material is dried and the dried material is subsequently sintered at a temperature range between 1400° C. and 1700° C. after being removed from the mold. Subsequently, the sintered product is crushed to obtain a desired grain size distribution.

According to another advantageous method, the dry process, the raw materials are milled in ball mill to obtain a fine grained powder mixture each powder having an average particle size of less than 5 μm. The fine grained powders are homogeneously mixed and the powder mixture such obtained is compacted at pressures up to 300 MPa for obtaining a compact body. Optionally, the powder can be wetted before compacting. The pressed bodies obtained by compacting are optionally dried and subsequently sintered at a temperature range between 1400° C. and 1700° C. Preferably, the dry powders are compacted and directly sintered. The sintered product is crushed to obtain the desired grain size distribution.

Preferably, andalusite, alumina and zircon sand are used as raw materials to obtain a mixture comprising 25 wt.-% to 35 wt.-% andalusite, 35 wt.-% to 45 wt.-% alumina, and 25 wt.-% to 35 wt.-% zircon sand, which is then processed accordingly. It is understood that also sillimanite, kyanite or other aluminosilicates may be used, however, andalusite is contaminated with sodium oxide and potassium oxide which catalyze the transformation of zircon sand into zirconia during the first hours of the heat treatment.

SHORT DESCRIPTION OF THE FIGURES

Figure 2:
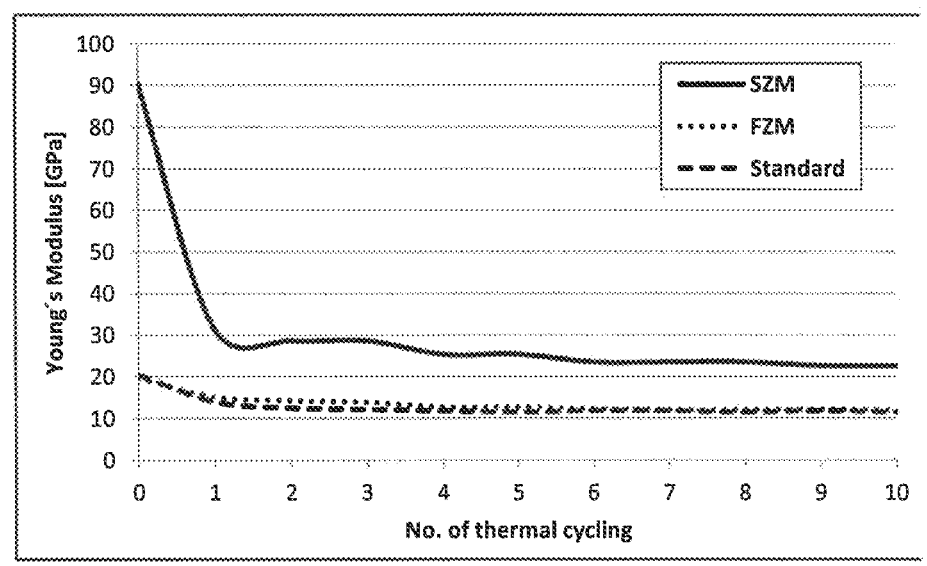
Figure 3:
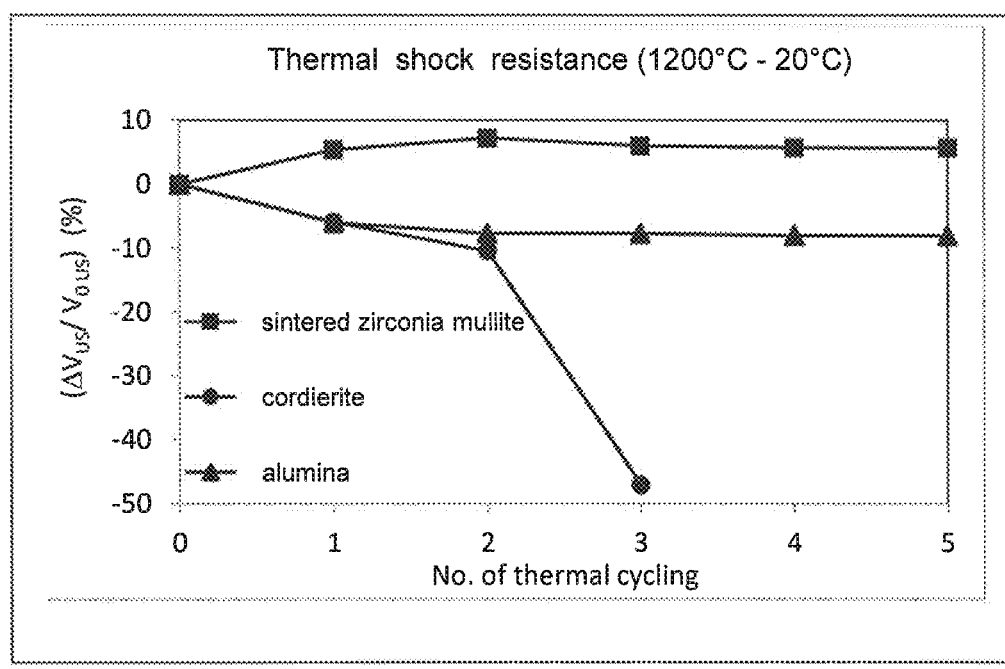
Figure 4:
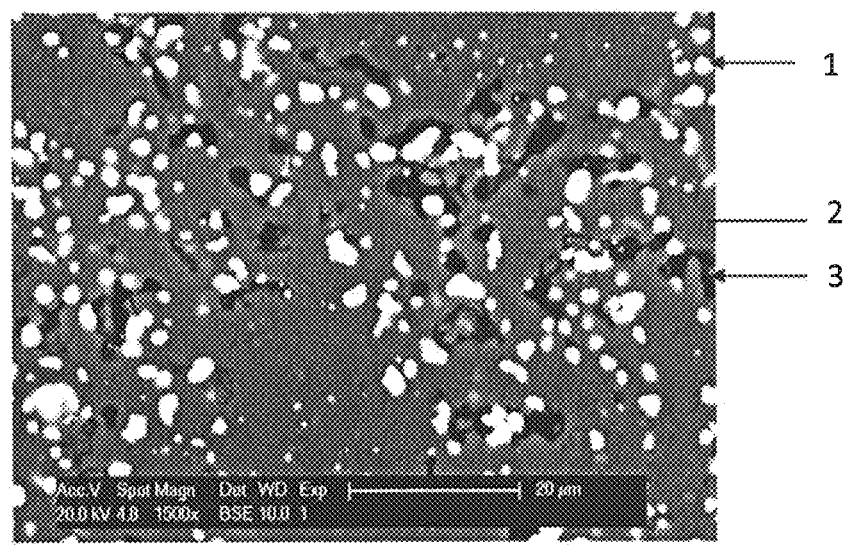

The present invention is additionally illustrated by reference to the following figures:

FIG. 1 shows a graphic representation of the compressive strength at high temperatures, FIG. 2 shows a graphic representation of the thermal shock resistance of refractory bricks, FIG. 3 shows a graphic representation of the thermal shock resistance of a composite according to the present invention, and FIG. 4 shows an SEM picture of a polished section with 1500-fold magnification.

DETAILED DESCRIPTION OF THE INVENTION

Below, the present invention is further explained by means of examples which should not be construed to unduly limit this invention.

Example 1

As a start, 28.47 wt.-% andalusite (m-KF), 39.37 wt.-% aluminum oxide (CT 3000) and 32.16 wt.-% zircon sand were homogeneously mixed. 43 wt.-% distilled water and 0.6 wt.-% dispersant (Darvan C) were added to the powder mixture and the dispersion so obtained was homogenized for 24 hours by means of a stirrer. The homogenized dispersion was cast into a mold, dried and the obtained solid body was sintered. A sintering program was used for sintering, whereby the solid body was heated up to 150° C. within 30 minutes, kept for 30 minutes at this temperature, and heated up to 1600° C. within 180 minutes. The product was sintered at 1600° C. for 24 hours and then cooled down to room temperature within 2 hours.

During sintering, the formation of mullite takes place in different ways. The primary mullite formation results from the decomposition of andalusite ($SiO_2.Al_2O_3$) into mullite ($2SiO_2.3Al_2O_3$) and silicon dioxide ($SiO_2$). The secondary mullite formation is effected by the reaction of aluminum oxide ($Al_2O_3$) with the silicon dioxide ($SiO_2$) from the decomposition of the zircon sand ($ZrSiO_4$) and the excess silicon dioxide ($SiO_2$) from the decomposition of andalusite ($SiO_2.Al_2O_3$). The total equation is:

$$3[SiO_2.Al_2O_3]+3Al_2O_3+ZrSiO_4 \rightarrow 2[2SiO_2.3Al_2O_3]+ZrO_2$$

Examples 2 and 3 were analogically produced.

The chemical and mineralogical compositions of the examples are summarized in table 1:

TABLE 1

| chemical composition | examples | | |
|---|---|---|---|
| (percent by weight) | 1 | 2 | 3 |
| $Al_2O_3$ | 58.00 | 58.10 | 56.50 |
| $Fe_2O_3$ | 0.36 | 0.30 | 0.42 |
| $SiO_2$ | 21.10 | 21.50 | 20.20 |
| $ZrO_2 + HfO_2$ | 20.17 | 19.85 | 22.47 |
| mineralogical composition | | | |
| (percent by weight) | | | |
| mullite | 72 | 69 | 72 |
| baddeleyite | 19 | 19 | 19 |
| $ZrO_2$ (tetr. + cub.) | 1 | 1 | 1 |
| corundum | 6 | 6 | 0 |
| zircon | 0 | 0 | 0 |
| amorphous phases | 2 | 5 | 8 |

During thermal treatment, the zircon sand is transformed into small zirconia particles having an average particle size of less than 5 μm. Mullite acts as a binder and forms the matrix of the composite. The transformation is catalyzed by the presence of alkali oxides during the first hours of the heat treatment.

Mechanical Properties

Bars for measuring the bending strength (CMOR=Cold Module of Rupture) and samples for measuring the cold crushing strength (CCS) were produced for testing the mechanical properties of the zirconia mullite composite.

Additionally, the true density and the open porosity were determined. The mechanical properties are described in table 2:

TABLE 2

| example | true density (g/cm$^3$) | open porosity (%) | CMOR (MPa) | CCS (MPa) |
|---|---|---|---|---|
| 1 | 3.32 | <1 | 88 | 569 |
| 2 | 3.31 | <1 | 76 | 481 |
| 3 | 3.51 | <1 | 86 | 292 |

Standard Castable Formulation Test

Furthermore, the sintered zirconia mullite refractory composite of example 1 (SZM) was, tested in a standard castable formulation in comparison to fused zirconia mullite (FZM). The recipe for the standard castable formulation is given in table 3.

By means of the corresponding castables, test bodies were produced for further physical investigations. The test bodies were dried at 110° C. for 24 hours and sintered for 3 hours each at 1000° C., respectively 1500° C. The sintering cycles are described in table 4. The physical properties of the test bodies are summarized in table 5.

TABLE 3

| recipe component | properties | percentages (wt.-%) |
|---|---|---|
| zirconia mullite | 3-5 mm | 16 |
| SZM (example 1) | 1-3 mm | 20 |
| FZM (comparison) | 0-1 mm | 24 |
|  | 0-0.09 mm | 20 |
| calcined alumina | CT 9 FG | 5 |
| micro silica | 971 U | 5 |
| reactive alumina | RG 4000 | 5 |
| cement | Secar 71 | 5 |
| sum |  | 100 |
| dispersant | STPP | 0.15 |

TABLE 4

| temperature range | heating rate | temperature range | heating rate |
|---|---|---|---|
| RT-750° C. | 300° C./h | RT-1250° C. | 300° C./h |
| 750° C.-950° C. | 120° C./h | 1250° C.-1450° C. | 120° C./h |
| 950° C.-1000° C. | 60° C./h | 1450° C.-1500° C. | 60° C./h |
| 1000° C.-1000° C. | 3 h | 1500° C.-1500° C. | 3 h |
| 1000° C.-RT | 720° C./h | 1500° C.-RT | 720° C./h |

As evident from the results in table 5 below, the sintered zirconia mullite composite according to present invention (SZM) and the conventional fused zirconia mullite (FZM) have comparable properties. Only the cold modulus of rupture of SZM at 1500° C. shows a significant higher value. This remarkable discrepancy is the subject of further investigations.

TABLE 5

| physical properties | | zirconia mullite composite | |
|---|---|---|---|
| | | SZM | FZM |
| required water (H$_2$O) (wt.-%) | | 5.5 | 5.3 |
| flowability (%) | | 70 | 75 |
| CMOR (MPa) | 110° C. | 15.8 | 14.3 |
| | 1000° C. | 31.7 | 26.2 |
| | 1500° C. | 37.4 | 21.9 |

TABLE 5-continued

| physical properties | | zirconia mullite composite | |
|---|---|---|---|
| | | SZM | FZM |
| CCS (MPa) | 110° C. | 120 | 143 |
| | 1000° C. | 195 | 205 |
| | 1500° C. | 186 | 179 |
| density (g/cm$^3$) | 110° C. | 2.76 | 2.83 |
| | 1000° C. | 2.80 | 2.97 |
| | 1500° C. | 2.81 | 3.02 |
| open porosity (%) | 110° C. | 12.4 | 11.5 |
| | 1000° C. | 15.5 | 16.8 |
| | 1500° C. | 16.6 | 14.6 |
| irreversible | 1000° C. | −0.29 | −0.32 |
| elongation (%) | 1500° C. | −0.79 | −0.55 |

Thermal Properties

To get an idea of the thermal properties of the composites according to the present invention (SZM), the refractoriness under load was measured in comparison to conventional fused zirconia mullite (FZM). The results are illustrated in FIG. 1 which shows that the conventional fused zirconia mullite and the sintered zirconia mullite according to the present invention behave comparably.

Thermal Shock Resistance (Refractory Bricks)

The thermal shock resistance of the zirconia mullite composite according to the present invention (SZM/example 1) was tested in comparison to commercially available fused zirconia mullite (FZM) and commercially available sintered zirconia mullite (standard) and is graphically illustrated in FIG. 2. There are significant differences to be realized between the composite according to the present invention and the commercially available materials, which can be explained with the different chemical and mineralogical compositions.

The composite according to the present invention is characterized by a high amount of mullite, whereas the commercially available zirconia mullites have significant lower mullite contents. The mineralogical phase distributions are described in table 6.

TABLE 6

| mineralogical phase (%) | zirconia mullite composite | | |
|---|---|---|---|
| | SZM | FZM | Standard |
| mullite | 74 | 54 | 61 |
| baddeleyite | 19 | 30 | 33 |
| ZrO$_2$ (kub. + tetr.) | traces | 1 | 1 |
| corundum | 1 | 0 | 1 |
| amorphous | 6 | 15 | 4 |

The recipe for the production of refractory bricks for testing the thermal shock resistance is summarized in table 7:

TABLE 7

| recipe component | properties | share (%) |
|---|---|---|
| clay | | 3.0 |
| reactive alumina | | 8.5 |
| zircon | | 5.5 |

TABLE 7-continued

| recipe component | properties | share (%) |
|---|---|---|
| zirconia mullite | | |
| SZM | 0-0.09 mm | 13.0 |
| FZM | 0-1 mm | 40.0 |
| standard | 1-3 mm | 30.0 |
| sum | | 100 |
| $H_2O$ | | 4.5 |
| additive | | 1.0 |

Initially, a suspension was made from the raw materials, which suspension was pressed to refractory bricks by means of a hydraulic press. The bricks were sintered at 1600° C. for 5 hours. Then, the density and the open porosity of the bricks were measured. The sintering program is described in table 8. The physical data of the bricks are summarized in table 9.

TABLE 8

| temperature range | heating rate |
|---|---|
| RT-1450° C. | 300° C./h |
| 1450° C.-1550° C. | 120° C./h |
| 1550° C.-1600° C. | 60° C./h |
| 1600° C.-1600° C. | 5 h hold |
| 1600° C.-RT | 720° C./h |

TABLE 9

| sample | density (g/cm³) | open porosity (%) |
|---|---|---|
| example 1 (SZM) | 2.81 | 16.0 |
| FZM | 3.06 | 16.3 |
| Standard | 3.05 | 17.7 |

The thermal shock resistance of the bricks was tested by heating the samples to 950° C. and subsequently cooling to room temperature (RT) by means of compressed air. The effect of the thermal shock was proved by means of ultrasonic transmission technic, whereby in each case an average value was established from three samples.

The progression of the Young's modulus is graphically illustrated in FIG. 2. For refractory bricks, the composite according to the present invention shows a big decline of the E-modulus after the first thermal shock and remains constant at high level, whereas the comparative examples show a low decline at the beginning, however, the E-modulus is constantly lower compared to the composite according to the present invention.

Thermal Shock Resistance (Composite)

FIG. 3 illustrates the Young's modulus of the composite according to the present invention in comparison to cordierite and alumina. The thermal shock resistance of the composite was tested by heating the samples up to 1200° C. and subsequently cooling to room temperature (RT) by means of compressed air. The effect of the thermal shock was proved by means of the ultrasonic transmission technique. The thermal shock resistance of the composite according to the present invention increases with the first and second thermal cycles and stays constant afterwards, whereas the thermal shock resistance of the cordierite collapses after the second cycle and the one of alumina decreases with the first and second cycles and subsequently stays constant at a low level.

Corrosion Resistance

Furthermore, the corrosion resistance against molten slags was tested in comparison to the commercially available fused and sintered zirconia mullite, wherefore refractory bricks according to the above described process and recipe were produced as well. A two centimeter deep hole having a diameter of one centimeter was drilled into the bricks and filled with finely ground glass. The bricks were filled with glass were heated in a furnace for 10 hours at 1350° C. After cooling, the bricks were cut by means of a longitudinal section through the middle of the drill hole and subsequently investigated using a scanning electron microscope in order to determine the depth of molten glass penetration. It was found that the molten glass had penetrated the fused zirconia mullite brick deepest, whereas for both sintered zirconia mullite bricks a comparable, very low depth of penetration and with it a high corrosion resistance was measured, whereby the zirconia mullite brick according to the present invention showed little advantages compared to the standard.

FIG. 4 shows a typical microstructure of a composite according to the present invention, whereby bright zirconia crystals 1 are embedded in a mullite matrix 2 (grey area). The dark areas are pores 3. Usually, the sintered composite has a microstructure comprising essentially homogeneously distributed zirconia particles 1 in a mullite matrix 2, wherein the average particle diameter of the zirconia particles 1 is preferably less than 5 μm, more preferably, less than 2 μm. With further investigations in the context of the present work, it was found that significantly finer and more homogeneous structures having fewer pores can be realized by carefully milling and processing the raw materials.

In summary it can be stated that it is possible to provide an excellent composite for the production of refractories, starting from andalusite as a low-priced raw material, whereby the composite is characterized by high thermal shock resistance and excellent corrosion resistance.

The invention claimed is:

1. A sintered zirconia mullite refractory composite based on aluminosilicate, alumina, and zircon sand, wherein
   the zirconia mullite refractory composite has a chemical composition comprising, in weight-percent:
      55% to 65% $Al_2O_3$;
      15% to 25% $SiO_2$;
      15% to 25% $ZrO_2$; and
      less than 3% raw material-based impurities,
   the zirconia mullite refractory composite has a mineralogical composition comprising 65 wt.-% to 85 wt.-% mullite and 15 wt.-%-35 wt.-% zirconia, and
   the zirconia mullite refractory composite comprises zirconia particles essentially homogeneously distributed in a mullite matrix, wherein the average particle diameter of the zirconia particles is less than 2 μm.

2. A composite according to claim 1, wherein the aluminosilicate comprises andalusite, kyanite, and/or sillimanite.

3. A composite according to claim 2, wherein the raw material basis of the composite comprises
   25 wt.-% to 35 wt.-% andalusite;
   35 wt.-% to 45 wt.-% alumina; and
   25 wt.-% to 35 wt.-% zircon sand.

4. A refractory castable for producing refractory bricks or cast pieces, comprising a refractory composite according to claim 1, wherein when sintered at a temperature between 1000° C. and 1700° C.,
   the castable has
      a Cold Module of Rupture (CMOR), measured according to EN 1402-5, of more than 80 MPa, and
      a Cold Crushing Strength (CCS), measured according to EN 1402-6, of more than 500 MPa.

5. A refractory castable according to claim 4, wherein the castable is a low cement castable (LCC) having a cement content of about 5 wt.-% or an ultra-low cement castable (ULCC) having a cement content of less than 2 wt.-%.

6. A method for manufacturing a sintered zirconia mullite refractory composite according to claim 1, the method comprising the steps:
  homogeneously mixing of finely ground raw material powders;
  forming a shaped body from the homogeneous mixture of the raw material powders;
  sintering the shaped body at a temperature range between 1400° C. and 1700° C.;
  crushing the sintered body to obtain a desired particle size distribution.

7. A method according to claim 6, wherein the forming of the shaped body comprises the steps:
  adding 15 wt.-% to 50 wt.-% water and 0.1 wt.-% to 1.0 wt.-% of a dispersant, each based of the total weight of the raw material mixture;
  homogenising the mixture to obtain a homogeneous dispersion of finely ground raw material powders;
  casting the homogeneous dispersion into a mold; and
  drying and subsequently sintering the cast material.

8. A method according to claim 6, wherein the forming of the shaped body comprises the steps:
  compacting the powder mixture at pressures up to 300 MPa to obtain compacts, whereby optionally small amounts of water are added;
  optionally drying of the compacts; and
  sintering the compacts.

9. A method according to claim 6, wherein the finely ground raw material powders comprise 25 wt.-% to 35 wt.-% andalusite, 35 wt.-% to 45 wt.-% alumina, and 25 wt.-% to 35 wt.-% zircon sand, each having a particle size of less than 5 μm.

10. A refractory castable for producing refractory bricks or cast pieces, comprising a refractory composite according to claim 2, wherein when sintered at a temperature between 1000° C. and 1700° C., the castable has:
  a Cold Module of Rupture (CMOR), measured according to EN 1402 5, of more than 80 MPa, and
  a Cold Crushing Strength (CCS), measured according to EN 1402 6, of more than 500 MPa.

11. A refractory castable according to claim 10, wherein the castable is a low cement castable (LCC) having a cement content of about 5 wt.-% or an ultra-low cement castable (ULCC) having a cement content of less than 2 wt.-%.

12. A refractory castable for producing refractory bricks or cast pieces, comprising a refractory composite according to claim 3, wherein when sintered at a temperature between 1000° C. and 1700° C., the castable has:
  a Cold Module of Rupture (CMOR), measured according to EN 1402 5, of more than 80 MPa, and
  a Cold Crushing Strength (CCS), measured according to EN 1402 6, of more than 500 MPa.

13. A refractory castable according to claim 12, wherein the castable is a low cement castable (LCC) having a cement content of about 5 wt.-% or an ultra-low cement castable (ULCC) having a cement content of less than 2 wt.-%.

* * * * *